United States Patent [19]

Lombardo

[11] 3,952,875

[45] Apr. 27, 1976

[54] DISH DRAINER

[75] Inventor: Virginia Lombardo, Valley Stream, N.Y.

[73] Assignee: Lawrence Peska Associates, Inc., New York, N.Y. ; a part interest

[22] Filed: Dec. 23, 1974

[21] Appl. No.: 535,374

[52] U.S. Cl. .............................. 211/41; 211/178; 220/6
[51] Int. Cl.² ......................................... A47G 19/08
[58] Field of Search ........ 248/157, 421, 166, 188.6, 248/176; 211/41, 104, 85, 126, 128, 130, 132, 177, 178 R; 220/19, 6; 16/191, 128 R, 140, 145, 172

[56] References Cited
UNITED STATES PATENTS

| | | | |
|---|---|---|---|
| 1,537,617 | 5/1925 | Panther | 220/6 |
| 2,197,789 | 4/1940 | Dalton | 220/6 X |
| 2,479,118 | 8/1949 | Jenness | 211/41 |
| 2,608,905 | 9/1952 | Nelson | 16/191 X |
| 2,686,598 | 8/1954 | Brecht | 211/41 |
| 2,765,111 | 10/1956 | Vaughn | 220/19 X |
| 3,160,278 | 12/1964 | Varkala | 211/85 X |
| 3,350,856 | 11/1967 | Revell | 16/128 R X |
| 3,383,003 | 5/1968 | Schurch | 220/19 X |
| 3,396,928 | 8/1968 | Lay | 248/188.6 |

Primary Examiner—Roy D. Frazier
Assistant Examiner—Terrell P. Lewis
Attorney, Agent, or Firm—Leon Nigohosian

[57] ABSTRACT

A collapsible dish rack, comprising:
a. a base portion comprising a first surface;
b. a number of apertured projecting first elements extending from said first surface;
c. a frame member disposed above said first surface and comprising a second surface facing said first surface;
d. a number of apertured projecting second elements extending from said second surface toward said first elements;
e. intermediate linking elements disposed between said first and second projecting elements, said linking elements individually comprising a first end portion pivotally disposed in an associated aperture of a said first projecting element and a second end portion pivotally disposed in an associated apertures of a said second projecting element; and
f. a detente portion located at at least one of said first and second projecting elements so as to engage the linking element associated therewith.

8 Claims, 6 Drawing Figures

DISH DRAINER

BACKGROUND OF THE INVENTION

The present invention relates to a collapsible dish rack.

Prior art dish racks that are collapsible require the use of extra elements, such as a H-shaped bail, for retaining the dish rack in a useable position. The present invention obviates the need for such an element and provides further advantages.

SUMMARY OF THE INVENTION

The present collapsible dish rack comprises a base portion having a first surface; plural apertured projecting first elements that extend from the first surface; a frame member that is disposed above the first surface and comprises a second surface facing the first surface of the base portion; plural apertured projecting second elements that extend from the frame member second surface toward the first elements; intermediate linking elements extending between the projecting elements, which have their individual first ends pivotally connected to the first projecting elements and their second ends so connected to the second projecting elements; and a detente portion located at at least one of the first or the second projecting elements, which detente portion can engage, the linking element with which it is associated.

PREFERRED EMBODIMENT

Figure 2:
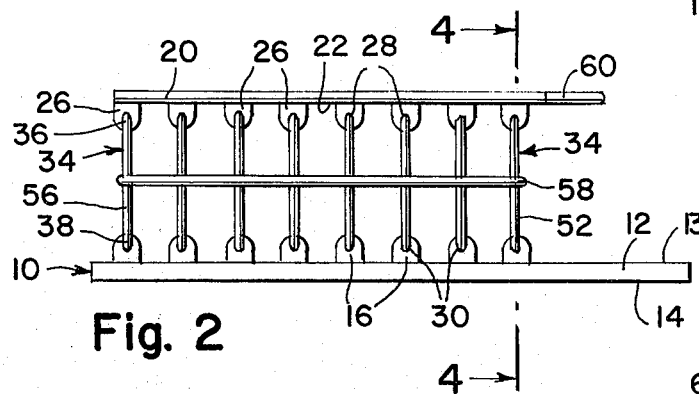
FIG. 2 is a side elevation view of the dish rack in an open position.
Figure 3:
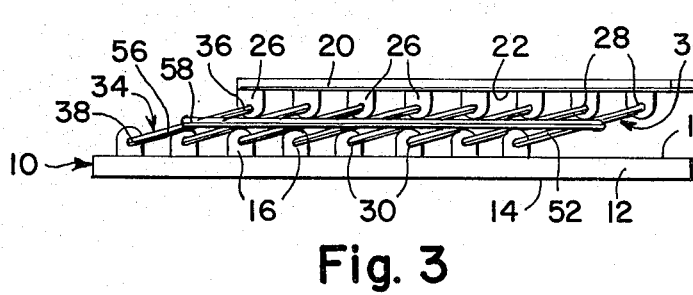
FIG. 3 is a side elevation view of the dish rack in a collapsed position.

Referring to the Figures, the present collapsible dish rack 10 comprises a base member or portion 12 that has an upper surface 13 and a lower surface 14, a plurality of projecting first elements or lugs 16 that extend from the upper surface 12 (FIG. 2), a frame member 20 that is located above the upper, or first surface 13 and comprises an under surface 22 that faces the first surface 13, and a plurality of projecting second elements, or lugs, 26 that, together with the first elements 16, contain apertures 28 and 30, respectively, and, further, intermediate linking elements 34 that are located between and connect the projecting elements 16, 26 which extend toward each other. The linking elements 34 comprise first and second end portions 36, 38, that are located at the apertures 28, 30 of the lug elements 16, 26 and are pivotable therein. The end portions 36, 38 can be generally hook shaped, so as to form an open hook or, preferably, a closed, or eyelet-like, hook, as shown. Two oppositely disposed sets of each of the lugs 16, 26 can be included, one set being at one side of the dish rack 10 and the other set being at the opposite side, this being so for each of the groups of lug elements 16, 26. With these lugs, the number of linking elements 34 can be equal to the number of each set of lugs, which linking elements 34 can be located at opposite sides of the dish rack.

The lower surface 14 of the base member 12 can comprise decorative matter 40, e.g., a picture, etc. The first and/or second projecting lugs 16, 26 can be separate parts that are connected to, respectively, the base portion 12 and the frame member 20 or can respectively form an integral structure therewith.

It is preferred that at least one, and more preferably, two or more, of the lug members 16, 26 comprise a detente portion, or groove, 44 that can, when the dish rack is fully open for use, releaseably engage the linking elements 34 with which it is associated so as to retain the dish rack in an open position and to be disengaged therefrom under force applied by the user (which force is applied to move the frame member with respect to the base member 12, thereby pivoting the linking elements about their respective lug members 16, 26) so as to collapse the dish rack 10. Either or both of the top or bottom sets of projecting elements or lugs 16, 26 can comprise detentes or grooves 44.

Figure 1:
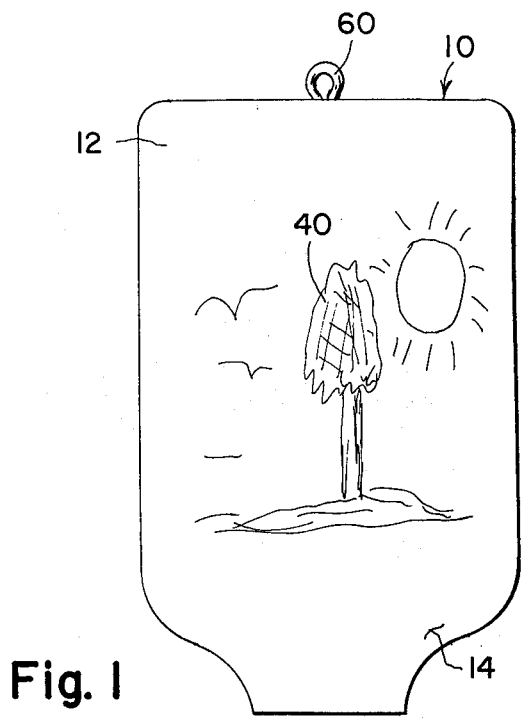
FIG. 1 is a bottom view of the present dish rack.

It is preferred that the linking elements 34 (e.g., all or only some, such as the lower ones, of the elements 34) comprise nose portions 50 at those parts of the linking elements that engage the projecting members or lugs members 16, 26 at the detente portions of the later so that these nose portions fit into the detente or grooves 44 and are engaged thereby. The collapsible dish rack 10 can further include an intermediate rod element 58 that is pivotally disposed at the central parts of the linking members and that it is connected to at least the terminal ones 52 and 56 of the linking members at each side of the collapsible dish rack 10 so as to transmit the rotational or relative motion of the frame member 20 with respect to the base member or portion 12, to the various linking elements 34 with which the rod element 58 is connected. Where it is desired there can be a rod element associated with the linking members or elements 34 at each side of the dish rack 10 or, alternatively, the rod element can be in a form of a rectangular frame that extends around the dish rack and surrounds the linking elements 34. The dish rack 10 can further comprise means for mounting it in a suspended position, which means can be, for example, a hook element or a eyelet element 60 that can fit over a nail or hook in a wall to permit the dish rack to be hung therefrom in a collapsed position (FIG. 1) such that the decorative side 14 of the base member is exposed and serves a decorative purpose.

Figure 4:
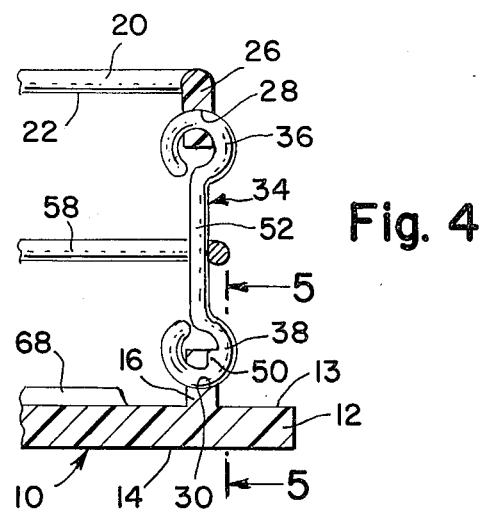
FIG. 4 is a fragmentary, sectional end view of the dish rack in FIG. 3 along axis 4—4.
Figure 5:
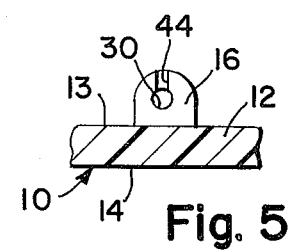
FIG. 5 is a partially sectional side elevation view of a projecting element in FIG. 4 along axis 5—5.
Figure 6:
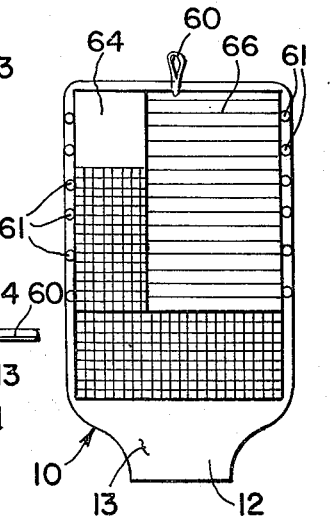
FIG. 6 is a top view of the dish rack.

The collapsible dish rack 10 can include a number of projecting pins 61 (FIG. 6) that are located at the side thereof and that extend upward so their free end is at the upper part and can receive, for example, drinking glasses. The dish rack 10 can further include a well 64 for receiving silverware and various compartments 66 for receiving dishes, plates, etc., which compartments can include ribbed portions 68 (FIG. 4) at the surface 13 of the base portion 12, which rib portions 68 can serve in standard fashion to retain the plates, saucers, etc. in their positions. The present dish rack can be made of standard materials, such as hard rubber, plastic, etc.

Pertinent hereto are U.S. Pat. Nos.: 2,070,826; 2,479,118; 2,686,598; 2,958,424; and 3,025,967.

Having thus described the invention, what I claim as new is:

1. A collapsible dish rack, comprising:
   a. a base portion comprising a first surface;

b. a number of apertured projecting first elements extending from said first surface;
c. a frame member disposed above said first surface and comprising a second surface facing said first surface;
d. a number of apertured projecting second elements extending from said second surface
e. intermediate linking elements disposed between said first and second projecting elements, said linking elements individually comprising a first end portion pivotally disposed in an associated aperture of a said first projecting element and a second end portion pivotally disposed in an associated aperture of a said second projecting element;
f. a detente portion located at at least one of said first and second projecting elements so as to engage the linking element associated therewith; and
g. a rod element pivotally disposed at central parts of said linking elements.

2. A collapsible dish rack as in claim 1, wherein at least one of said linking elements comprises a protruding nose portion adapted to engage a projecting element associated therewith at the detente portion of said projecting element.

3. A dish rack as in claim 1, wherein each one of said first elements comprises a said detente portion.

4. A dish rack as in claim 1, wherein each one of said second elements comprises a said detente portion.

5. A dish rack as in claim 1, comprising oppositely disposed sets of said linking elements and wherein said rod element is substantially rectangular in shape and surrounds said linking elements.

6. A dish rack as in claim 1, wherein said frame member comprises means for mounting said dish rack in a suspended position.

7. A dish rack as in claim 6, wherein said mounting means comprises one of a hook element and an eyelet element.

8. A dish rack as in claim 1, wherein said base portion comprises a third surface comprising decorative matter.

* * * * *